United States Patent [19]

Shen et al.

[11] 4,187,146
[45] Feb. 5, 1980

[54] REDUCTION OF RADIOACTIVE EMISSIONS FROM NUCLEAR-REACTOR PLANT

[75] Inventors: Ti-Ke Shen, Monroeville, Pa.; John R. Coombe, Marblehead, Mass.

[73] Assignee: Westinghouse Electric Corp., Pittsburgh, Pa.

[21] Appl. No.: 841,772

[22] Filed: Oct. 13, 1977

Related U.S. Application Data

[63] Continuation-in-part of Ser. No. 592,858, Jul. 2, 1975, abandoned, which is a continuation-in-part of Ser. No. 378,287, Jul. 11, 1973, abandoned.

[51] Int. Cl.² ................ G21C 19/30; G21C 15/00
[52] U.S. Cl. .................................... 176/37; 176/38; 60/646; 60/657; 60/690; 60/692
[58] Field of Search ............... 176/37, 38, 65; 60/646, 60/657, 690, 692, 661, 688, 689

[56] References Cited

U.S. PATENT DOCUMENTS

| | | | |
|---|---|---|---|
| 3,068,164 | 12/1962 | Coles et al. | 176/37 |
| 3,113,913 | 12/1963 | Newton | 176/37 |
| 3,322,141 | 5/1967 | Gans, Jr. et al. | 176/37 |
| 3,384,550 | 5/1968 | Hanzalek | 176/38 |
| 3,431,168 | 3/1969 | Kjemtrup | 176/37 |
| 3,625,817 | 12/1971 | Anderson | 176/38 |
| 3,679,372 | 7/1972 | Hartman, Jr. et al. | 176/37 |

OTHER PUBLICATIONS

"Nuclear Eng. Handbook", 1958, by Etherington, pp. 13.9, 13.176.
"Introduction to Health Physics", by Cember, 1969, pp. 323–334, 399, 400.
Nuclear Eng. Int., Dec. 1972, vol. 17, No. 199, p. 1020.

Primary Examiner—Harvey E. Behrend
Attorney, Agent, or Firm—J. R. Campbell; Z. L. Dermer

[57] ABSTRACT

Radioactive emissions by reason of primary-liquid-to-secondary-liquid leakage in the steam generator of pressurized water reactor power plants are reduced by a demineralizer in the discharge from the blowdown tank and also by transmitting blowdown venting vapor to the condenser. For major failures resulting in power blackout an auxiliary turbine is provided. This turbine is connected to be energized by vapor (steam) by-passed from the main steam line. The auxiliary turbine drives the pumps which pump the cooling water for the condenser. The steam which drives the auxiliary turbine is also discharged to the condenser. The condensed water flows back into the steam generators where it is discharged through the blowdown tank.

2 Claims, 1 Drawing Figure

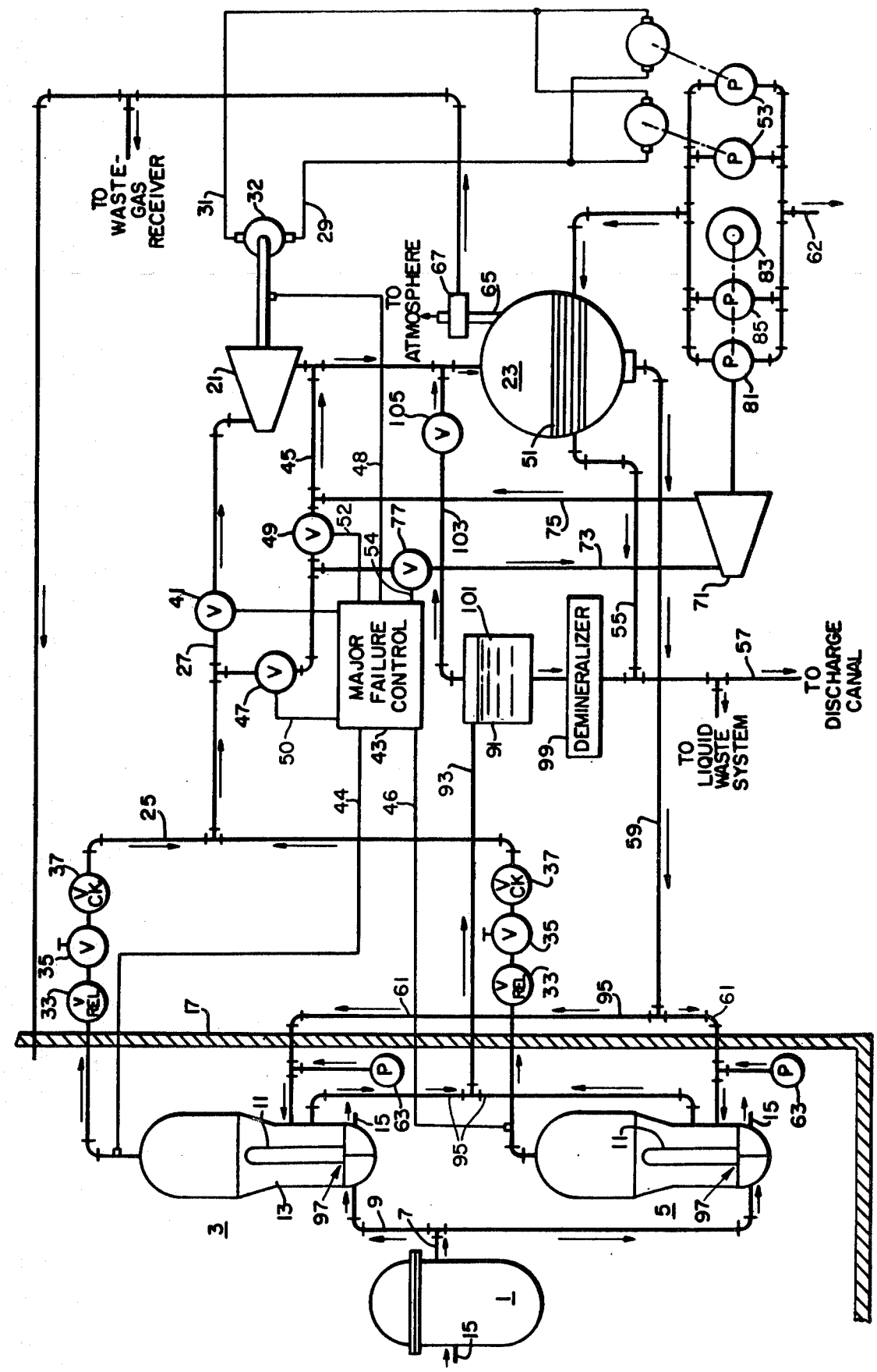

REDUCTION OF RADIOACTIVE EMISSIONS FROM NUCLEAR-REACTOR PLANT

This application is a continuation-in-part of application Ser. No. 592,858 filed July 2, 1975, now abandoned, which is a continuation of application Ser. No. 378,287 filed July 11, 1973, now abandoned.

BACKGROUND OF THE INVENTION

This invention relates to the nuclear-reactor art and has particular relationship to the reduction or suppression of excessive radioactive emissions into the atmosphere or the environment of a nuclear-reactor plant. In the interest of concreteness this application deals with pressurized water reactors (PWRs). However, to the extent that this invention is applicable to nuclear reactors of other types, such use of this invention is regarded as within the scope thereof.

A nuclear reactor plant includes a nuclear reactor and one or more vapor, usually steam, generators. Water under pressure of about 2250 pounds per square inch is heated by the heat developed by fission in the reactor to about 600° F. and serves as primary liquid in the steam generator, vaporizing the secondary liquid, usually also water, by heat exchange. The vapor drives a main turbine which generates electrical power. The vapor from the turbine is liquefied in a condenser and returned as secondary liquid to the vapor generators. The condenser is cooled by a cooling liquid, usually water, circulated through cooling coils by pumps. The pumps are driven by the electrical power supplied by the main turbine or by off-site power where available.

The primary-liquid and secondary-liquid pipe or conductor in the vapor generators are sealed from each other. However, the primary liquid is at substantially higher pressure than the secondary liquid and leakage of the primary liquid into the secondary liquid may occur. Since the primary liquid includes raioactive materials, it is necessary to provide environmental protection against radioactive emissions from secondary liquid contaminated with radioactive materials.

Nuclear reactor plants provided in accordance with the teachings of the prior art have no facilities for reducing the radioactive emissions from the secondary liquid. It was contemplated that the leakage, which aries by reason of minor structural defects or water chemistry or other causes, is relatively small, less than 0.1 gallon per minute, and that such small leakage would not produce harmful radiation. In such prior-art apparatus a portion of the secondary liquid is conducted with sediment, such as scale produced by corrosion and dissolved matter and the like into a blowdown tank. The liquid in the blowdown tank is discharged into a discharge receiver, usually a river, ocean or lake and the vapor over the liquid in the tank is vented into the atmosphere. This practice may result in excessive, non-permissible radioactive emission.

Non-permissible radioactive emission also results when a major failure occurs in the apparatus. Typical of a major failure are rupture of the primary conductors (steam generator tubing), rupture of the main steam pipe, or station or plant blackout. In this case the vapor from the vapor generators are, in accordance with the teachings of the prior art, in part, vented into the atmosphere through a relief valve and in part by-passed around the turbine into the condenser if off-site power is available to drive the circulating pumps for the condenser. Since the turbine is not, during a major failure, delivering power, the condenser cooling may not be vailable. Excessive environmental radioactive emission is produced because of steam dump through the relief valve.

It is an object of this invention to overcome the above-described disadvantages of the prior-art nuclear-reactor plants and to provide such a plant in the use and operation of which environmental radioactive emissions shall be maintained within permissible limits.

SUMMARY OF THE INVENTION

This invention, in one of its aspects, arises from the realization that the primary-liquid-to-secondary-liquid leakage, which occurs in steam generators, is higher than contemplated. Typical operating experience has revealed that under unusual conditions, the leakage may be as high as 1 gallon per minute or even higher. It is also known that the predominant radioactive material injected into the secondary liquid as a result of this leakage are radioactive isotopes of iodine although there are minor quantities of other materials.

In accordance with this invention the discharge from the blowdown tank is demineralized by an ion-exchange demineralizer interposed between the tank and the discharge canal or discharge receiver. Typically, about 50 gallons per minute of secondary liquid flows into the blowdown tank. But, because the pressure of the liquid flowing into the blowdown tank is reduced substantially from its initial 1000 pounds per square inch, about one-third of the liquid evaporates so that only about 30 gallons per minute of liquid flows out of the tank. Typically, the discharge water from the condenser flows through the same channel as the discharge from the tank. The radioactive iodine concentrations in the water discharged from the blowdown tank are thus reduced to permissible levels before being mixed with the condenser circulating water. The discharge from the demineralizer can also be discharged to the liquid waste system in the unlikely event that, in spite of the presence of the demineralizer, the fission product concentrations exceed the criteral limit of discharge to the environment.

In addition, the blowdown tank vapor instead of being vented to the environment is transmitted to the condenser. This reduces environmental emissions because the partition factor of iodine in the condenser is substantially lower than for the blowdown tank. The partition factor is defined for the blowdown tank as:

$$\frac{\text{microcuries radioactivity per gram in the vapor}}{\text{microcuries radioactivity per gram in the liquid}}.$$

for the condenser the partition factor is defined as:

$$\frac{\text{microcuries radioactivity per cubic centimeter in vapor}}{\text{microcuries radioactivity per cubic centimeter in liquid}}.$$

The partition factor in the blowdown tank is of the order of $10^{-1}$ and in the condenser $10^{-4}$. The concentration of radioactivity of the vapor in the blowdown tank is thus reduced by transfer to the condenser instead of venting.

In accordance with another aspect of this invention, on the occurrence of a major failure, auxiliary pumping facilities are provided for the cooling liquid for the condenser to replace the normal electrically driven pumps. These facilities include a turbine and a Diesel drive, each driving auxiliary pumps. The turbine, is driven by the by-pass vapor which is diverted from the main turbine after the latter trips out. The auxiliary circulating pump driven by this turbine provides cooling liquid to the condenser to take the place of the main electrical circulating pumps. The Diesel-driven auxiliary circulating pump is installed for redundancy. A cost saving may be affected by eliminating one or two of the spare electrical circulating pumps.

In addition, the effluent, which is predominately air, from the air ejector from the condenser is controlled so that, in the event that the radioactivity in the ejected air is excessive, the ejected effluent is transferred to the waste gas receiver or to the contaminant of the reactor which has low radioactive leakage.

BRIEF DESCRIPTION OF THE DRAWING

For a better understanding of this invention, both as to its organization and as to its method of operation, together with additional objects and advantages thereof, reference is made to the following description, taken in connection with the accompanying drawing, in which the single FIGURE is a diagrammatic view showing an embodiment of this invention and apparatus with which this invention is practiced.

DETAILED DESCRIPTION OF THE INVENTION

The apparatus shown in the drawing is a nuclear-reactor plant including a nuclear reactor 1, typically a PWR, and steam or vapor generators 3 and 5. The primary liquid or coolant from the reactor 1 flows along conductors, symbolically represented as 7 and 9, to the primary conductors 11 of the generators 3 and 5. The conductors 11 are of generally U-shaped structure as shown and are in heat interchange relationship with secondary liquid in the region 13 enveloping the conductors 11. The primary liquid returns through conductors, symbolically represented at 15. The reactor 1 and the generators 3 and 5 are enclosed in a conventional containment 17 impervious to radioactive emissions.

External of the containment 17 the nuclear reactor plant includes a main turbine 21 and a condenser 23. The vapor or steam generated in the generators 3 and 5 flows along the main vapor pipes symbolically represented at 25 and 27, to the turbine 21 to drive the turbine. The vapor is then discharged to condenser 23. The turbine 21, when in operation, supplies electrical power through generator 32 to the buses 29 and 31. In the pipe 25 from steam generators 3 and 5 there is a relief valve 33, a control valve 35 and a check valve 37. Since these valves are conventionally used in nuclear reactor power plant secondary systems, for simplicity purposes, they are shown serially connected in the steam generator output piping. Relief valves 33 function to protect the steam generators and connected secondary system by opening or lifting when the secondary system pressure exceeds a predetermined value. Control valves 35 control steam flow into the secondary system, and serve to isolate the steam generators under conditions of ruputer occurring in the secondary system piping, and the like, while check valves 37 preclude reverse flow into the steam generators.

As is customary, conventional control equipment indicated as major failure control 43, monitors system parameters, such as steam generator pressure, turbine shaft speed, and the like, and operates appropriate system valves depending on the system conditions. Lines 44 and 46 extending between the steam generators and major failure control 43 permits monitoring the steam generator pressure while line 48 extending to the turbine shaft allows monitoring of shaft speed. Lines 50, 52 and 54 indicate electrical connections to valves 47, 49 and 77 respectively, which according to conventional practices, are controlled by solenoids (not shown) or other electrically operated apparatus. Control over valve 41 typifies the function served by major failure control equipment 43.

Upon the occurrence of a break in the steam generator tubing or piping, which results in loss of pressure or steam flow to turbine 21, major failure control equipment 43 will detect the adverse condition and operate valve 41 to a closed position to isolate turbine 21. Simultaneously, valves 47 and 49 are opened to bypass the turbine and discharge steam into condenser 23. In the alternative, such steam flow may be directed to turbine 71 as more fully explained hereafter. During normal operation of the plant these valves 47 and 49 are maintained closed preventing by-pass of the turbine 21.

The condenser 23 has cooling coils 51 for liquefying the spent vapor from the turbine 21. Cooling liquid, usually water from a river, the ocean or a lake 62, is transmitted through the coils 51 by pumps 53 which are energized from the buses 21 and 31 (off-site power, if any not show). In the event of blackout by reason of a major failure and lack of off-site power, these pumps 53 would not be in operation. The cooling liquid passes through conductors 55 and 57 to a discharge canal (not shown) whenc it is discharged into the river, lake, or ocean 62. The liquid in the condenser 23 is fed back, to the secondary-liquid conductors of vapor generators 3 and 5, through conductors 59 and 61. Auxiliary liquid to replenish losses is also supplied by pumps 63 when the main feedwater pumps (not shown) are not available. The condenser 23 includes an air ejector 65 through which air is ejected, either by a vacuum pump (not shown) or by a conventional steam-operated air ejector, to maintain the condenser 23 evacuated. The ejector 65 is connected to a radioactivity-responsive control 67 which, if the radioactivity in the ejected air is excessive, produces an alarm and directs the ejected air to a waste-gas receiver (not shown) or, if the receiver is full, to the containment 17.

For the eventuality of a major failure, or loss of turbine load, for example, the plant includes, in accordance with this invention, an auxiliary turbine 71 in addition to the main turbine 21. The turbine 71 is supplied by conductors 73 and 75 which by-pass the valve 49. A valve 77 is controlled from the major-failure control 43. On the occurrence of a minor failure, valve 41 is closed and valves 47 and 77 are opened while valve 49 remains open to discharge excessive vapor into the condenser 23. If there is not excess of vapor, valve 49 is closed. The turbine 71 is enabled and at the same time the flow of vapor, which may be radioactive, is not discharged through relief valve 33 because the reduced system pressure cannot open it, and the vapor is therefore dumped into the condenser 23. The spent vapor from turbine 71 flows into condenser 23 through conductor 75. The auxiliary turbine 71 drives pumps 81 which maintain the flow of cooling liquid through the coils 51 when the electrical circulating pumps 53 are out of operation because there is no power on buses 29-31 and there is no off-site power. For the eventuality that the vapor through turbine 71 may be inadequate a diesel engine 83 is provided. This engine 83 drives additional auxiliary pump 85 to maintain flow of cooling liquid through coils 51 in case of failure of turbine 71. The vapor in the condenser 23 returns to the vapor generators 3 and 5.

The plant also includes a blowdown tank 91. Secondary liquid carrying sediment and dissolved solids from the steam generators 3 and 5 is supplied to the blowdown tank 91 through conductors or pipes 93 and 95. It is assumed that there is primary-liquid-to-secondary liquid leakage in generators 3 and 5 as indicated by arrows 97. The secondary liquid which flows into blowdown tank 91 through conductors 95 and 93 is then radioactive. In accordance with this invention the discharge from the blowdown tank 91 flows into the discharge canal (not shown) through a demineralizer 99 which removes radioactive material predominately radioactive iodine. In addition, the vapor above the liquid 101 in the blowdown tank 91 is transmitted by conductor 103 to the condenser 23. The conductor 103 has a valve 105 for controlling the flow of this vapor. Further during a major failure the liquid which is returned from the condenser 23 to the steam generators 3 and 5 is also discharged into the blowdown tank 91 and demineralized of its radioactive materials.

While preferred mode of practice of this invention has been disclosed herein, many modifications thereof are feasible. This invention is not to be restricted except insofar as is necessitated by the spirit of the prior art.

We claim:

1. The method of reducing to permissible limits the rejection into the environment of radioactive materials from liquid in the secondary system of a nuclear-reactor plant resulting from primary system to secondary system liquid leakage, the said secondary system including at least one vapor generator cooperatively coupled to a main turbine and an auxiliary turbine for supplying vapor thereto, a blowdown tank, a condenser connected to the tank and turbine outlets, and means for circulating a cooling liquid to cool said condenser, the said method including conducting the secondary liquid contaminated by radioactivity, as the result of said leakage, into said blowdown tank;

conducting the vapor generated by the liquid in said blowdown tank to said condenser;
venting fluid from said condenser;
sensing the existence of radioactive gases in said fluid and selectively discharging said radioactive gases to a waste gas receiver, and after it is filled, discharging said gases into a containment enclosing the reactor in said plant;
discharging the contaminated liquid from said blowdown tank into a demineralizer;
removing radioactive materials from said contaminated liquid in the demineralizer; and,
discharging the resulting non-contaminated liquid to a discharge receiver;
diverting vapor from the main turbine in part through the auxiliary turbine and in part through said consensor to enable the auxiliary turbine;
causing the auxiliary turbine while so enabled to circulate cooling fluid through the condenser;
discharging fluid from the auxiliary turbine to the condenser; and,
transmitting the condensed liquid from the condenser to the vapor generator.

2. A nuclear reactor power plant including a nuclear reactor having means for heating a primary liquid with the heat generated by the nuclear reaction in said reactor;
at least one vapor generator including means for subjecting a secondary liquid therein to heating;
at least one main turbine;
connections between said reactor and said generator for circulating the primary liquid through the generator to effect heat interchange between said primary liquid and said secondary liquid thereby converting said secondary liquid into vapor capable of driving said main turbine;
connections between said generator and said turbine for transmitting such vapor thereto for driving said turbine;
a condenser having cooling means, and means for transmitting a cooling fluid through said cooling means to liquefy vapor from the turbine in said condenser;
means connecting said vapor generator, said turbine and said condenser in secondary-liquid-circulating relationship;
a blowdown tank and connections between said generator and blowdown tank for transmitting a portion of the secondary liquid and sedimentary and dissolved radioactive materials in said generator to said blowdown tank;
connections between said blowdown tank and said condenser for transmitting the vapor in said blowdown tank to said condenser;
radioactive material removal means connected to said blowdown tank for removing said radioactive materials from the liquid prior to discharging the liquid into a discharge receiver;
an auxiliary turbine connected in parallel with said main turbine;
means for isolating said main turbine; and,
feedwater pumps connected to said auxiliary turbine which supply liquid to the condenser, thereby assuring the delivery of cooling water to the condenser under conditions which result in isolation of the main turbine.

* * * * *